J. BLUM.
THREAD SPLITTING AND CUTTING MACHINE FOR EMBROIDERED FABRICS.
APPLICATION FILED DEC. 23, 1919.

1,408,856.

Patented Mar. 7, 1922.
6 SHEETS—SHEET 1.

Inventor
John Blum
By his Attorney
Joseph F. O'Brien

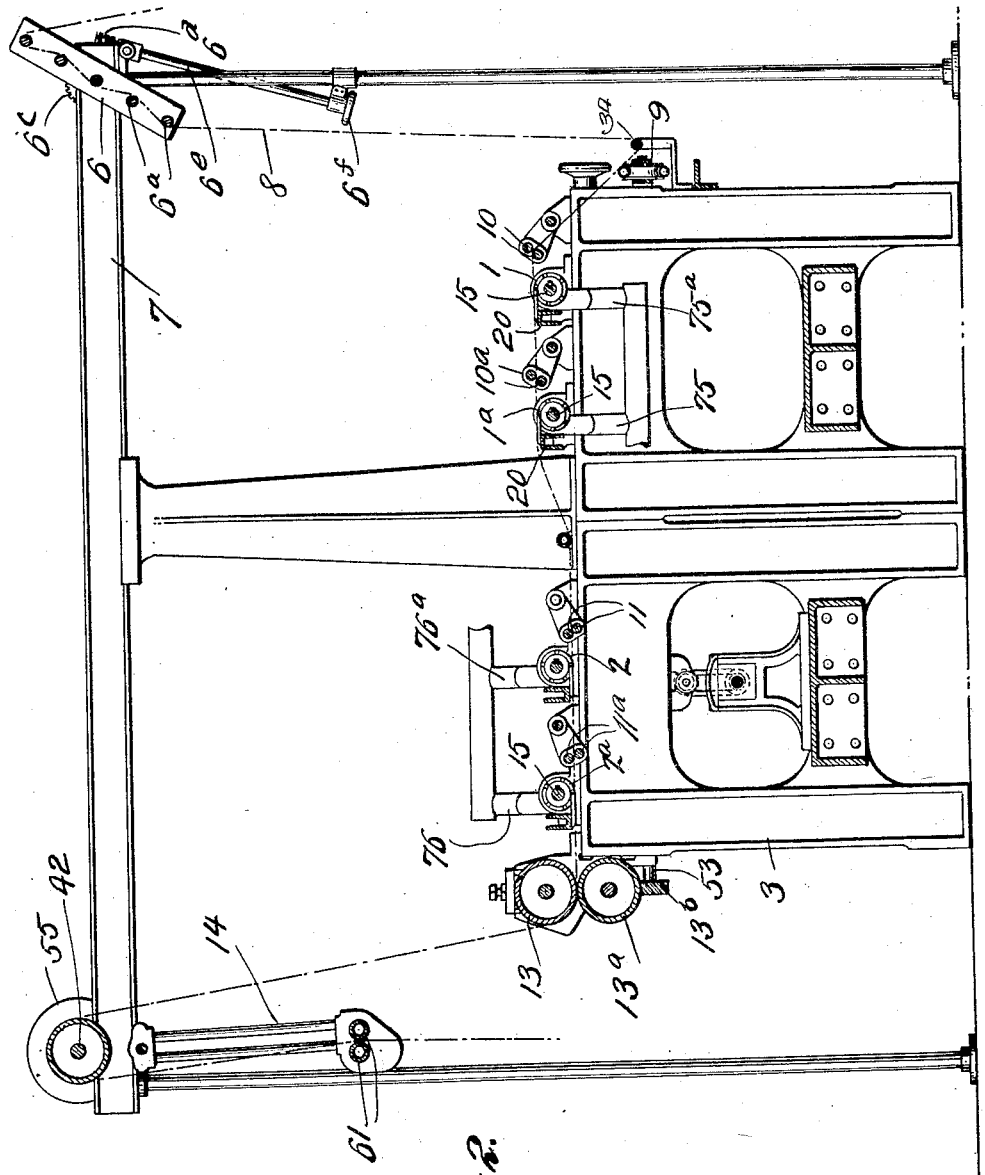

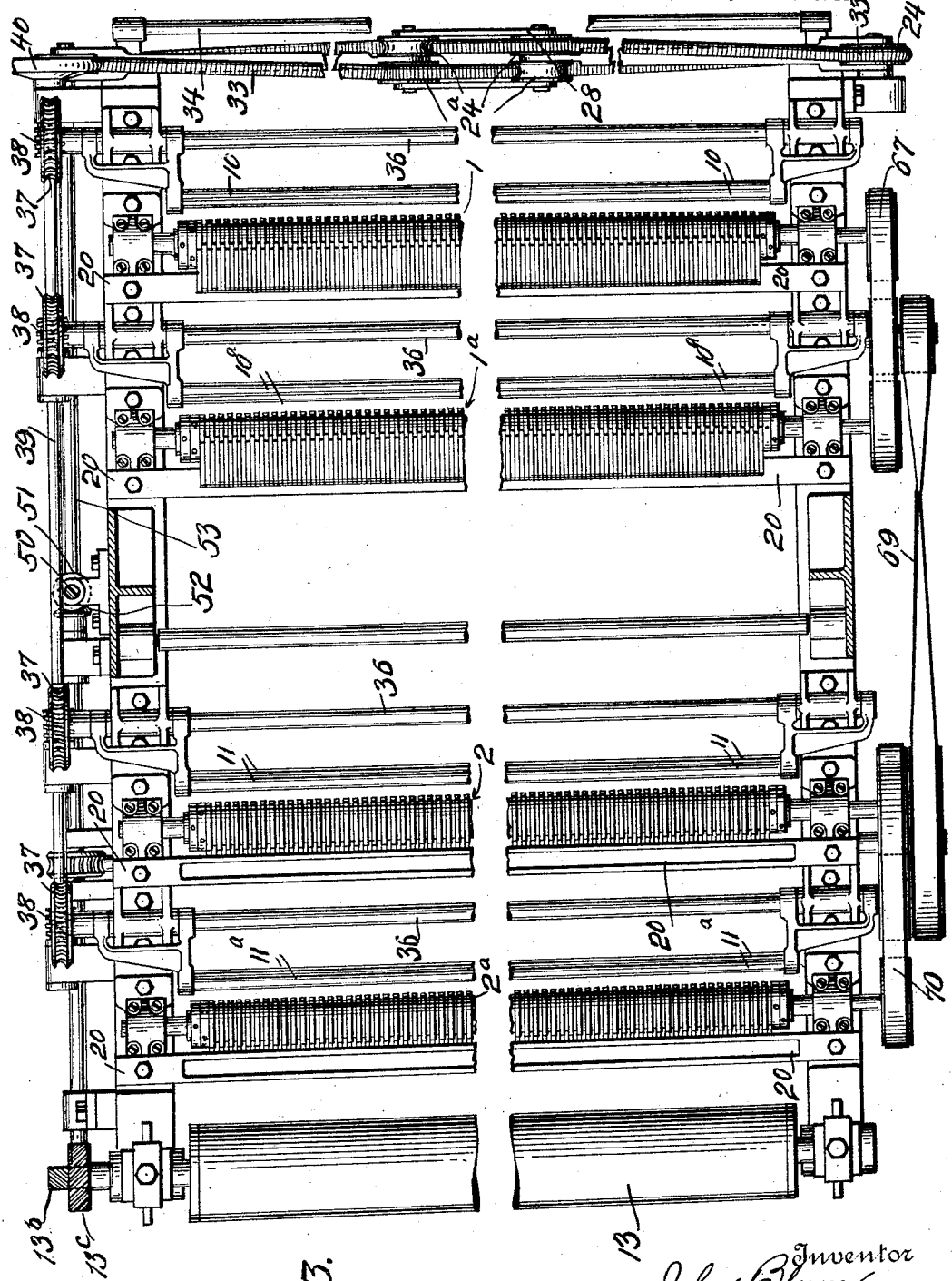

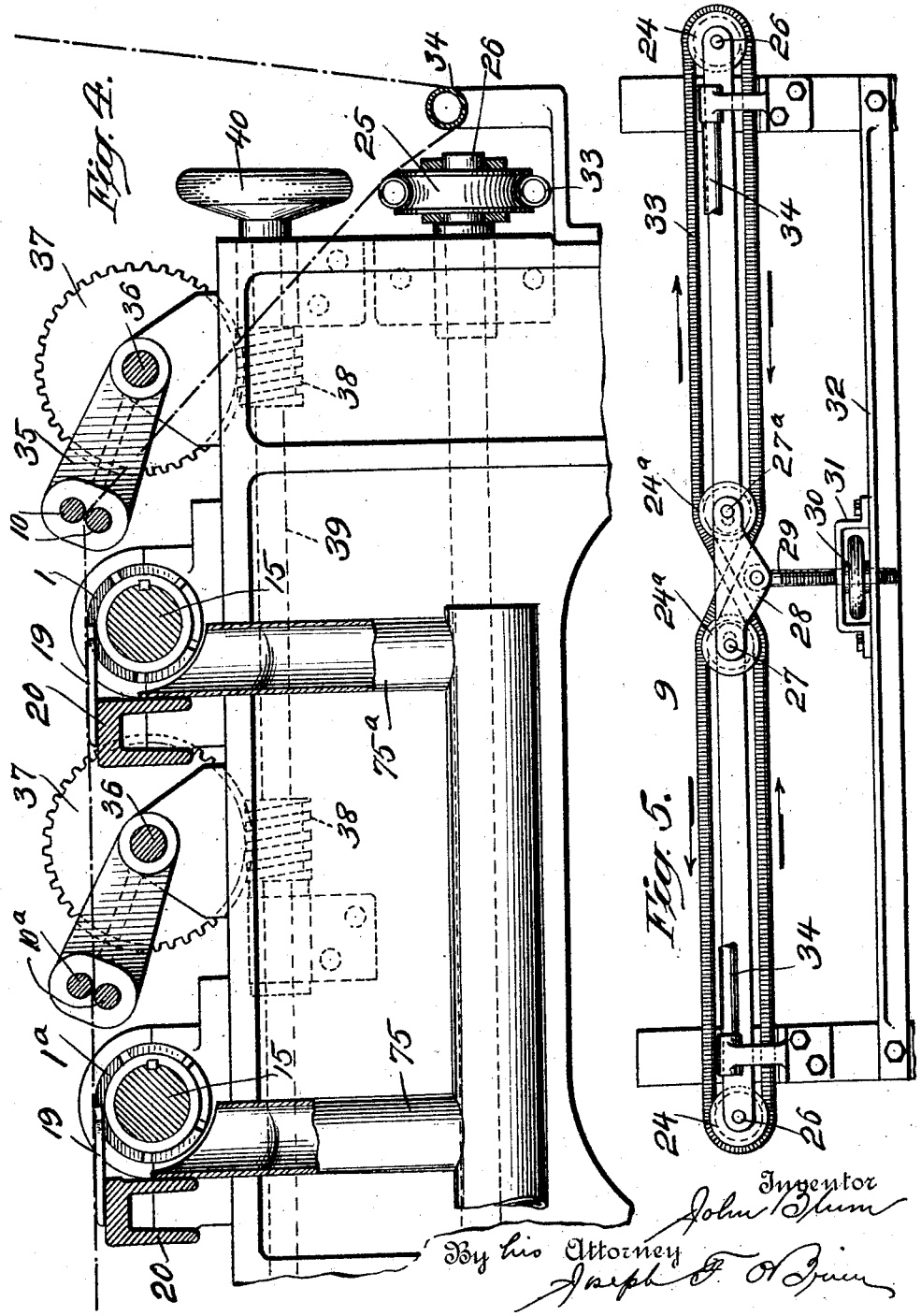

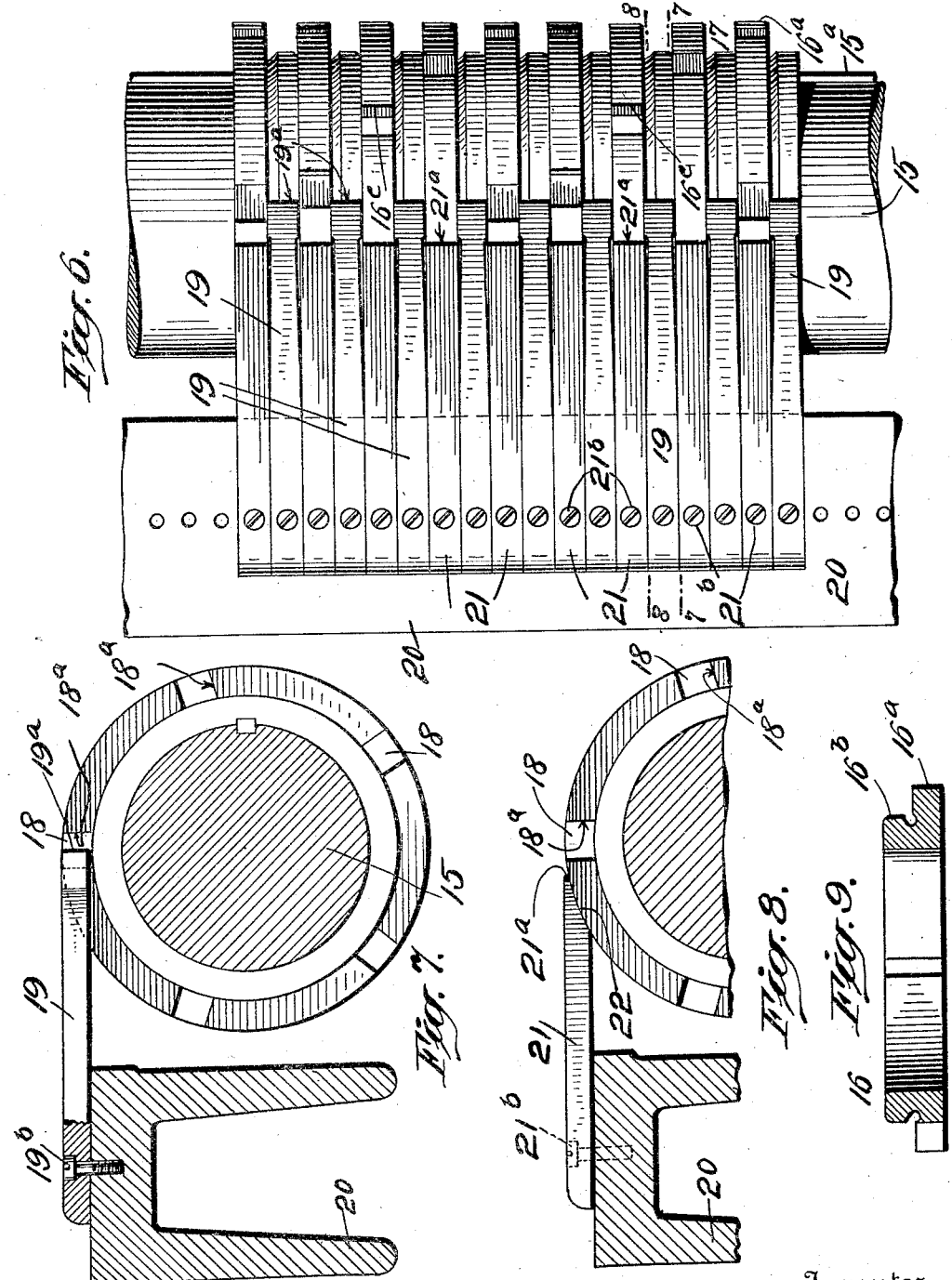

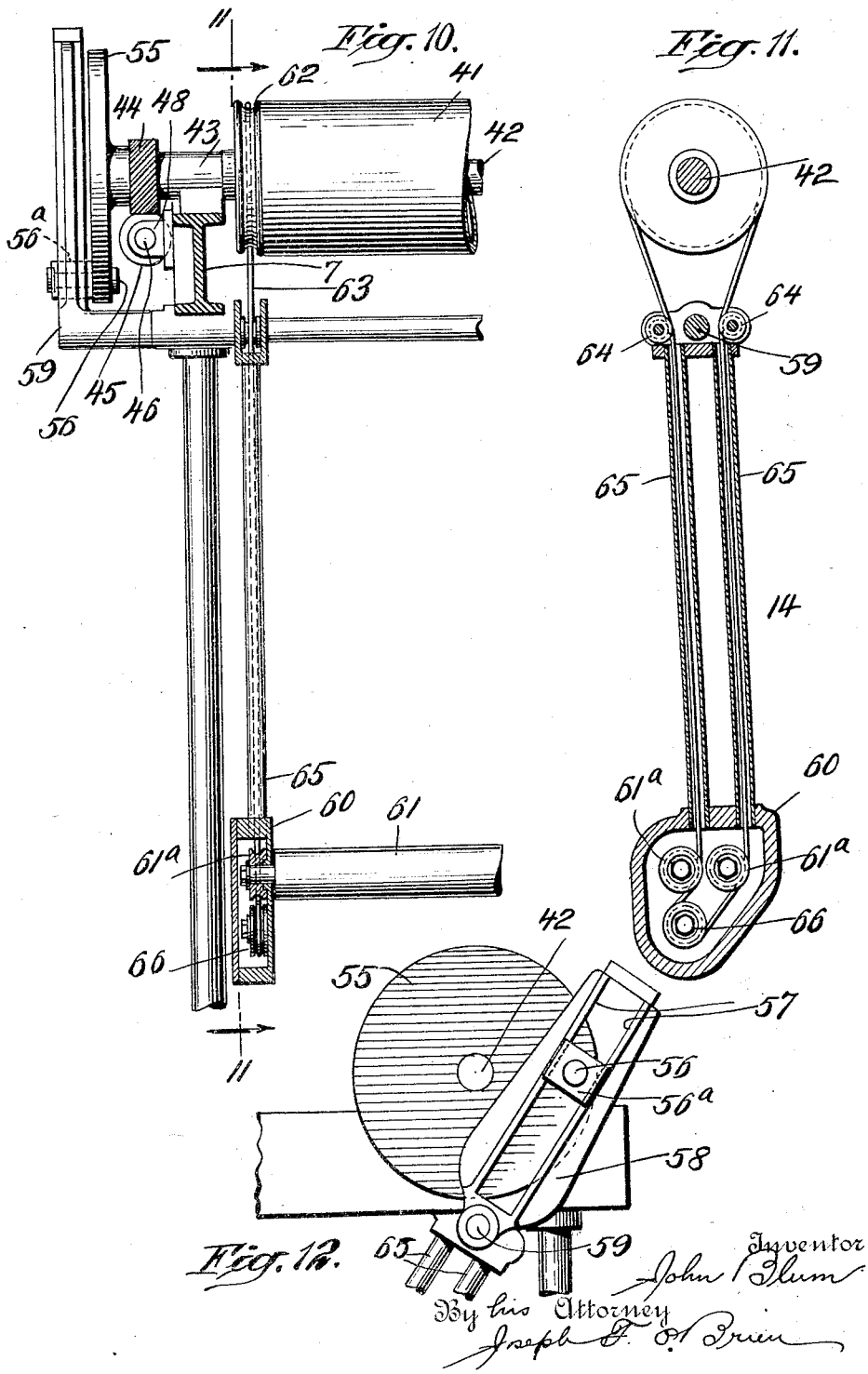

UNITED STATES PATENT OFFICE.

JOHN BLUM, OF WEST HOBOKEN, NEW JERSEY.

THREAD SPLITTING AND CUTTING MACHINE FOR EMBROIDERED FABRICS.

1,408,856. Specification of Letters Patent. Patented Mar. 7, 1922.

Application filed December 23, 1919. Serial No. 346,940.

*To all whom it may concern:*

Be it known that I, JOHN BLUM, a citizen of the United States, and a resident of West Hoboken, in the county of Hudson and State of New Jersey, have invented certain new and useful Improvements in Thread-Splitting and Cutting Machines for Embroidered Fabrics, of which the following is a specification.

This invention relates to improvements in thread splitting and cutting machines for embroidered fabrics.

In the conventional end cutting machines heretofore employed, a cutter is rotated at a predetermined distance above a supporting or guiding element for the embroidered fabric and such fabric is guided into proximity to cutters which rotate above the upper side of the embroidered fabric. The result is that when a seam between lengths of the embroidery fabric is encountered, it is necessary to move the cutting elements away from the fabric to prevent a cutting of such seam. This movement is accomplished manually and requires careful and constant watching by an attendant.

One object of this invention is to eliminate the necessity of moving the cutting elements and fabric support relatively and to provide a cutting device with which the fabric contacts and means operating beneath the contacting surface of the cutting device for splitting the connecting threads and cutting off the ends so that uneven surfaces of the embroidered fabric will be supported and guided automatically into proper relationship with the splitting and cutting devices and no manual movement thereof will be required.

Another object of this invention is to produce a machine by which the connecting threads intermediate embroidered designs may be split and the severed ends then cut close to the embroidered designs, all by the same device and in one operation.

Another object is to procure greater speed, accuracy and certainty of the splitting and severing or cutting operations for the connecting threads and ends respectively than has heretofore been possible.

Another object of this invention is to provide a rotatable thread-splitting or end-cutting device having integrally formed therewith a contacting surface over which the embroidered fabric moves, and means below or coincident with the circumference of said rotatable contacting surface for severing the hanging threads or ends depending therefrom, whereby the embroidery may, without damage, be freely rolled or moved on or by the contacting surface and only the connecting threads or severed ends which extend or hang beneath this contacting surface will be split or cut.

Another object is to produce a machine in which the connecting threads will be split and the ends cut off from both faces of the embroidery during one passage of the fabric therethrough, whereby much greater efficiency and saving of time is procured.

Another object of this invention is to provide in a single element a cutter or cutting element having a fabric contact surface, said cutter preferably comprising a series of cutting rings or collars, each provided with a contact surface portion, a circumferential groove portion and transverse grooves intersecting the contact portion, preferably at a plurality of points around the circumference to provide cutting walls adapted to cooperate with stationary cutting blades to split the connecting threads and cut off the ends respectively. In the preferred form of this invention, a shaft is provided with a series of parallel cutting rings, each having a circumferential groove alternating with outwardly extending contact surfaces, each collar preferably having a plurality of transverse cutting grooves extending across the contact surfaces and communicating with the opposite circumferential grooves, so that the series of collars not only form a contact surface and guide for the embroidered fabric but the top and side walls of the transverse grooves are adapted to cooperate respectively with stationary elements, some of which are fitted within the circumferential grooves to cooperate with the side walls of such transverse grooves, and others are disposed tangentially on the contact surface of the rings or collars.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:

Fig. 2 is a vertical section of the machine shown in Fig. 1, the machine being reversed in the two views;

Fig. 3 is a view in plan of the said machine in the position shown in Fig. 2, part of the middle section thereof being broken away;

Fig. 4 is an enlarged vertical section similar to Fig. 2 of two of the thread-severing devices and adjacent parts;

Fig. 5 is a front view of fabric stretching device preferably employed by me;

Fig. 6 is a view in plan of a portion of the combined supporting and cutting device employed by me;

Fig. 7 is a section on the line 7—7 of Fig. 6;

Fig. 8 is a section partly broken away on the line 8—8 of Fig. 6;

Fig. 9 is a detail section of one of the combined embroidery supports and thread cutters;

Fig. 10 is an enlarged elevation partly in section of one end of the embroidery folding or depositing frame preferably employed in my improved machine;

Fig. 11 is a section on the line 11—11 of Fig. 10, looking in the direction of the arrow; and Fig. 12 is an enlarged side view in elevation of the upper part of the mechanism shown in Fig. 10.

Figure 1:
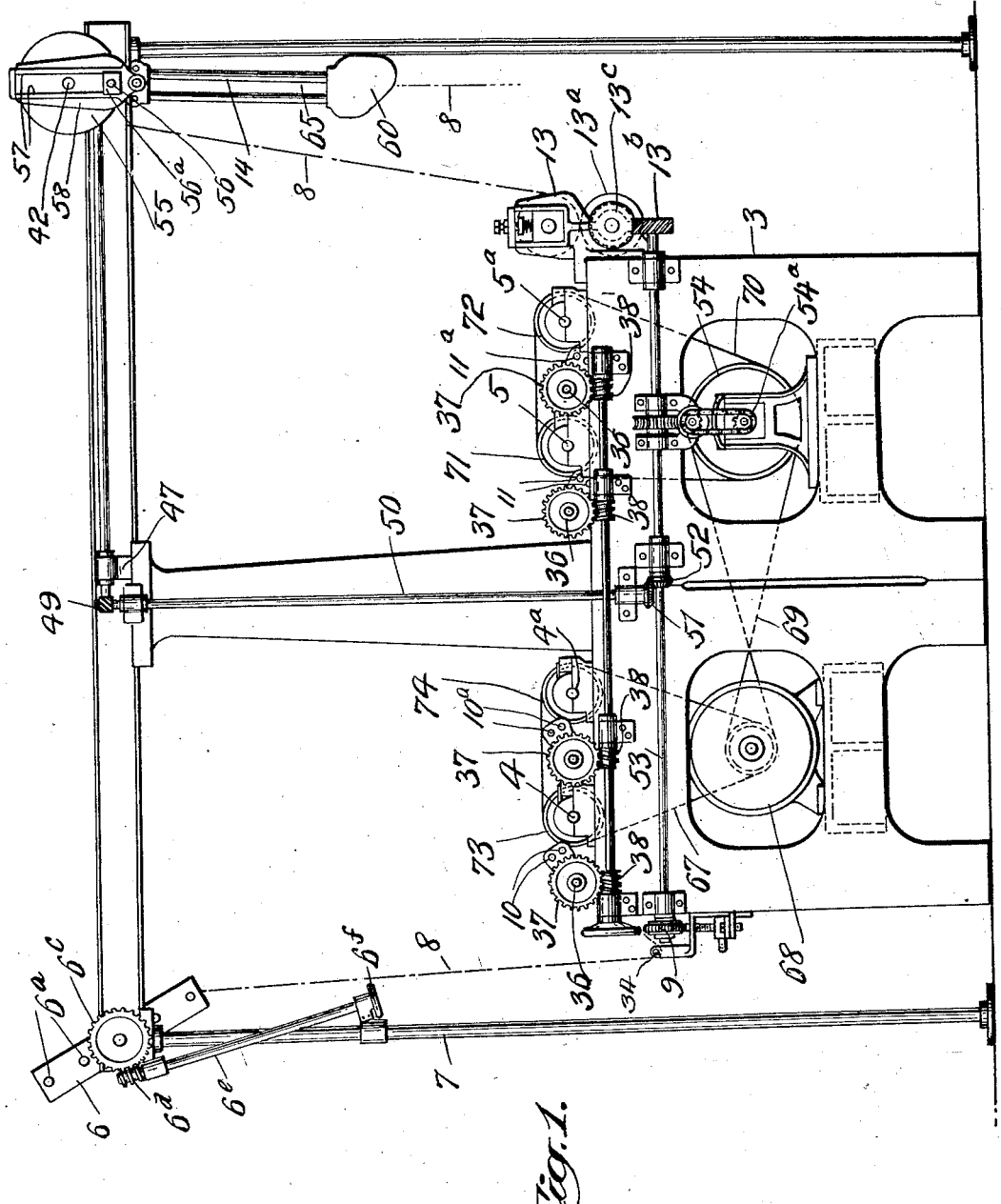
Fig. 1 is a view in elevation of one side of a machine embodying my invention.

Referring now to these drawings, which illustrate a preferred embodiment of my invention, 3 indicates the main frame of the machine.

*The thread-cutters or severing devices.*

Suitably mounted in the main frame 3 are a plurality of combined supporting and thread-severing devices, preferably arranged in pairs, 1, $1^a$—2, $2^a$, and as shown, are so mounted to have rotary movement only on shafts 4—$4^a$—5—$5^a$ journalled in suitable bearings in said frame 3. Preferably such supporting and severing devices are so arranged that when a piece of embroidery is fed or moved once through the machine all the connecting threads on both sides or faces of the embroidery will be split and the ends cut close to the designs in a single passage or movement through the machine.

These rotary severing or cutting devices 1—$1^a$ and 2—$2^a$ are preferably of identical construction and are preferably, as shown, arranged in pairs and each pair so disposed with relation to cooperating blades as to permit two of such elements to operate on one side or face of the embroidery and the other pair to operate upon the opposite side of the same fabric. This pairing of devices is done for the purpose of insuring the severing and removal of all ends or threads from both surfaces of the embroidery fabric, including the splitting of the connecting threads and the cutting off of the ends when so split, but it will be obvious, however, that a single severing device might be employed, if desired, and both sides of the embroidery presented thereto by passing the same through the machine two or more times. Said rotary thread-cutters or severing devices each comprise a series of thread-cutting or severing elements 16 keyed to shafts 15 supported on gudgeons 4, $4^a$ and 5, $5^a$. Each of these elements 16, as shown, (see Fig. 6) is identical in construction and is provided with an outer collar portion $16^a$ and a reduced or groove-portion $16^b$, the arrangement being such that when a series of these elements 16 are keyed on the shaft the various outer collar portions $16^a$ will be arranged at the outer periphery of the device and the reduced portions $16^b$ below such periphery, so that a series of circumferential grooves 17 will be formed between the opposite walls of said peripheral parts $16^a$ of the severing element 16. At one or more places around the circumference of the portion $16^a$ a transverse radially-disposed groove 18 is formed which communicates on its opposite sides with the circumferential grooves 17, and thus forms front and rear walls. The corners $18^a$ formed between the walls of these transverse radially disposed grooves and the circumferential grooves are preferably sharp and cooperate with the edges $19^a$ of a series of stationary cutting blades 19 seated in the circumferential grooves to split or cut any ends which may project or hang below the surface of the part $16^a$. These stationary cutting blades are, as shown, mounted upon supporting beams or bars 20 arranged parallel to the cutting devices and each of said cutting blades are preferably independently connected at one end to said beam or bar 20 in any suitable way, and, as shown, (see Figs. 6, 7 and 8) by screws $19^b$ and have their opposite ends free and projecting outwardly from said supporting beam and disposed in the said circumferential grooves with the outer cutting edges thereof in such disposition to the radial side walls of the transverse radially-disposed grooves 18 as to cause a cutting or scissors action to take place below the peripheral fabric-supporting surfaces $16^a$ when the cutting device 1 is rotated relatively to the said free edge of the cutting blade 19. It will be obvious that when embroidery is superimposed upon the peripheral supporting surfaces 16$^a$ of a cutting device, any connecting threads which hang below the surface thereof and extend into the transverse grooves will be split or severed by the cooperative action of the radial side walls of the transverse grooves and the edges of the cutting blades 19 which are seated in said circumferentially disposed grooves.

In order further to split and cut such threads the edge or corner 16$^c$ formed between the outer periphery or surface of the part 16$^a$ and said transverse groove 18 is also preferably cut sharp, and I provide another series of segmental cutting blades 21 to cooperate with the said cutting edge. Each of these segmental cutting blades is also preferably mounted upon the bar 20 at one end and has its opposite end projecting outwardly and provided with an arc-shaped groove 22 which fits over the outer periphery of the part 16$^a$, so that the outer transverse edge 21$^a$ of the said blade will, when the cutting device is rotated, produce with said transverse cutting edge a contacting cutting or scissors action. These latter cutting blades are preferably so connected to the bar 20 by screws 21$^b$ and are slightly shorter than the blades 19 so that the free cutting ends thereof extend within a distance of the cutting ends of the cutting blades 19, the cutting ends of the latter being preferably disposed in a plane perpendicular to the axis of the cutting device 16, while the cutting edge of cutting blades 21 are disposed at one side of such perpendicular.

When the two series of cutting blades are arranged as above indicated, one of them disposed between the other, a flat table surface is formed over which the embroidery is adapted to travel in its passage through the machine and over the cutting devices.

*The embroidery guiding and stretching devices.*

The embroidery to be treated is first preferably placed upon a feed rack 6 supported upon an outer frame 7 above the severing devices and the embroidery fabric 8 is guided from said rack beneath a roller 34 and into contact with a suitable spreading or stretching device 9; thence between guide-rollers 10 which retain the same in contact with the upper fabric-supporting surface of the first supporting and severing device 1 and the table-like part formed by the co-operating blades during which time the connecting threads are subjected to the cooperative action of said rotary cutting devices and blades. The fabric is then passed through another pair of guide rollers 10$^a$ and into contact with the upper surface of the other member 1$^a$ of the first pair of severing devices and over the cooperating blades thereof for the purpose of cutting any ends which may have been missed by the first device. The embroidery fabric is then led through or between another pair of guide-rollers 11 beneath and into contact with the lower surface of the first member 2 of the second pair of severing devices and its cooperating blades; then between the second pair of guide rollers 11$^a$ and beneath and into contact with the lower surface of the member 2$^a$ of the severing devices; the arrangement being such that one face of the embroidery fabric is presented to or placed in contact with the severing devices 1—1$^a$ and their cooperating blades, and the opposite face is likewise placed in contact with the pair of severing devices 2—2$^a$, after which the embroidery passes between suitable guide rollers 13—13$^a$ and upwardly to a rocking folding frame 14.

The fabric stretching device 9 may be of any suitable form and as shown it comprises a series, and preferably two pairs, of pulleys 24—24$^a$, each of said pulleys preferably being provided with edge grooves 25, and such pulleys are arranged with their grooves in parallel plane extending across the front of the machine. As illustrated, the end pulleys are journalled on stub shafts 26, journalled in suitable bearings at the opposite sides of the front of the machine, while the central pulleys 24$^a$ are mounted on spindles 27—27$^a$ journalled in spaced plates 28 which is mounted to move vertically upon a screw shaft 29, threaded in a nut 30, fastened in place by a strap 31 to a horizontal supporting bar 32 stretched across the machine. Mounted upon the pulleys to extend across and parallel to the front of the machine is an endless belt 33, both runs of which are crossed between the centrally mounted pulleys 24$^a$ so as to cause two parts of the top run thereof to move in opposite directions at the opposite sides of the central portion thereof in order to cause a fabric which contacts therewith to be stretched by frictional contact therewith in opposite directions from the central portion of said fabric. As illustrated, this belt is cylindrical in conformation and composed of a series of rings of spring wire so as to enable the same to procure a better frictional contact with the embroidered fabric. A roller bar 34 is disposed parallel to said belt at one side thereof so as to guide the fabric into contact therewith.

The guiding rollers 11$^a$—12 and 12$^a$ are all of similar construction and as illustrated are mounted upon the end of rocking arms 35 which are pivoted on a shaft 36, on which is mounted a gear wheel 37 which meshes with a worm 38 on a shaft 39 adapted to be rotated by a knob 40 to rock the arm 35 and guide rollers mounted thereon so as to accurately guide the embroidered fabric into contact with the thread cutting or severing devices and their cooperating blades. The rack 6 is of conventional construction comprising a series of parallel bars 6$^a$ in frame members 6$^b$, which frame is adapted to rock about one of the central bars. This rocking is adjusted by means of a gear 6$^c$ meshing with a worm 6$^d$ on a downwardly extending shaft 6$^e$ suitably mounted on the frame and having a knob or handle 6$^f$ for manipulating the same.

The construction of the fabric folding frame 14 is illustrated in Figs. 1, 2 and 10 to 12. As illustrated, a roller 41 is mounted upon a shaft 42 in suitable bearings 43 on the upper frame 7 of the machine and the shaft 42 is, as illustrated, rotated by means of a helical gear 44 meshing with a helical gear 45 on a shaft 46 which, as shown in Figs. 1 and 10, is mounted in bearings 47 and 48 respectively and is rotated by intermeshing helical gears 49 from a vertical shaft 50 suitably supported on the frame of the machine and having at its opposite end a bevelled gear 51, which meshes with another bevelled gear 52 on the drive shaft 53, which is rotated by suitable transmission from the pulley 54 and its shaft 54$^a$. Mounted at one end of the roller shaft 42 is a disc wheel 55 having a pin 56 eccentric of the axis thereof, which pin extends into a block 56$^a$ sliding in ways 57 in a rocking frame 58 pivoted at 59 to the upper frame of the machine.

The shaft 53 also preferably drives the rollers 13 13$^a$ at one end of the machine by means of the helical gear 13$^b$ and at the opposite end drives one of the pulley wheels 24 to drive the belt 33 which is mounted thereon.

The rocking arm is provided below the pivot 59 with a pendulum portion 60 which is rocked by means of the disc wheel 55 and rocking arm 58, said pendulum portion being provided with two rollers 61 between which the fabric is adapted to be passed. These rollers are preferably rotated in opposite directions in order to cause the fabric to be moved outwardly therethrough and I preferably provide for this purpose a groove wheel 62 on the shaft 42, over which wheel a continuous belt 63 passes, which belt is, as shown in Fig. 11, conducted downwardly on the inner side of pulleys 64 and through opposite conduits 65, and over pulleys 61$^a$ in the same direction and thence around an idler pulley 66, the arrangement being such as to cause the two pulleys 61$^a$ and the rollers 61 associated therewith to be rotated in opposite directions during the swinging or rocking movement of the pendulum frame 60. It is obvious that when the embroidery fabric is passed down through these rollers 61$^a$ and the frame rocked as aforesaid, the fabric will be swung from side to side as it is fed downwardly by the rollers and neatly folded on the floor or other suitable place contiguous to the machine.

The pulley 54 is driven by the motor 68 by belt 69 which in turn rotates the severing devices 2, 2$^a$ by belt 70 running over pulleys 71 and 72 on shafts 5—5$^a$ and said motor has a direct driving connection by belt 67 and pulleys 73 and 74 with the shafts 4 and 4$^a$ for the severing devices 1 and 1$^a$ respectively.

Suitable suction apparatus, such as the hoods 75—75$^a$ and 76—76$^a$, are provided for carrying away the ends when split and cut off by the thread severing apparatus.

Having described my invention I claim:

1. In a thread-splitting and cutting machine for embroidered fabrics, a rotatable cutting element provided with a fabric-contacting surface in fixed relationship with said cutting element and having depressed grooves beneath such contact surface extending transversely of the path of rotation of said cutting element and means cooperating with said grooves for severing threads extending from the embroidered fabric into such grooves.

2. In a thread-splitting and cutting machine for embroidered fabrics, a rotatable cutting element provided with a fabric-contacting surface forming part thereof and rotating therewith and having depressed grooves beneath such contact surface extending transversely of the path of rotation of said cutting element and means cooperating with the walls of such transverse grooves for severing threads on the embroidered fabric.

3. In a thread-splitting and cutting machine for embroidered fabrics, a rotatable cutting element having a contact-surface for the embroidered fabric and provided with a series of depressed grooves extending transversely of the path of rotation of said cutting element and another series of circumferential grooves intersecting the said transverse grooves, and means fitting within said circumferential grooves and cooperating with the walls of the transverse grooves to cut threads extending from said embroidered fabric within said grooves.

4. In a thread-splitting and cutting machine for embroidered fabrics, a rotatable cutting element embodying a shaft, a series of abutting cutting rings mounted on said shaft each provided with a contact surface portion for the embroidered fabric and having a depressed groove portion intersecting said contact surface transversely of the path of movement thereof and also having a depressed circumferential-groove portion communicating with the transverse groove; and a stationary cutter-blade disposed within each circumferential groove and cooperating with the side walls of the transverse cutting grooves to cut threads extending from the contacting face of the embroidered fabric within the grooves.

5. In a thread-splitting and cutting machine for embroidered fabrics, a rotatable cutting-element embodying a shaft, a series of abutting cutting-rings mounted on said shaft each provided with a contact surface for the embroidered fabric and having a depressed groove portion intersecting said contact surface transversely of the path of movement thereof and also having a depressed circumferential-groove-portion communicating with the transverse groove, a stationary cutter blade disposed within each circumferential groove portion and cooperating with the side walls of the transverse cutting grooves and another series of stationary elements contacting with said contact surfaces and adapted to cooperate with the top edge of said transverse grooves to cut the threads extending from the contacting face of the embroidered fabric within said grooves.

6. In a thread-splitting and cutting machine for embroidered fabrics, a rotatable cutting-element embodying a shaft, a series of abutting cutting-rings mounted on said shaft, each provided with a contact surface for the embroidered fabric and having a depressed groove portion intersecting said contact surface transversely of the path of movement thereof and also having a depressed circumferential-groove-portion communicating with the transverse groove, a stationary cutter blade fixed at one end and having its free cutting edge positioned within each circumferential groove substantially in a perpendicular plane passing through the axis of the shaft and cooperating with the side walls of the transverse cutting grooves and another series of stationary elements contacting with said contact surfaces and adapted to cooperate with the top edge of said transverse grooves to cut the threads extending from the contacting face of the embroidered fabric within said grooves.

7. In a thread-splitting and cutting machine for embroidered fabrics, a rotatable cutting-element embodying a shaft, a series of abutting cutting rings feathered on said shaft, each provided with a contact surface for the embroidered fabric and having a depressed groove portion intersecting said contact surface transversely of the path of movement thereof and also having a depressed circumferential-groove portion communicating with the transverse groove, a stationary cutter-blade disposed within each circumferential-groove-portion and cooperating with the side walls of the transverse cutting grooves, and another series of stationary cutting elements bearing on said contact surfaces and adapted to cooperate with the top edge of said transverse grooves and positioned to the rear of a perpendicular passing through the axis of said cutting element.

8. In a thread-splitting and cutting machine for embroidered fabrics, a rotatable cutting element embodying a shaft, a series of abutting cutting rings mounted on said shaft, each provided with a contact surface for the embroidered fabric and having a depressed groove portion intersecting said contact surface transversely of the path of movement thereof and also having a depressed circumferential-groove-portion communicating with the tranverse groove, a stationary cutter blade fixed at one end and having its free cutting edge positioned within each circumferential groove substantially in a perpendicular plane passing through the axis of the shaft and cooperating with the side walls of the transverse cutting grooves to cut the threads from the contacting face of the embroidered fabric, another series of elements also fixed at one end, having its free end bearing on said contact surfaces and adapted to cooperate with the top edge of said transverse grooves, said free end being positioned to the rear of a perpendicular passing through the axis of said cutting element and being provided with an arc-shaped groove corresponding with the arc of the contact surface to cause the top surface of each of such cutting blades to be disposed tangentially to the contact surface to produce a smooth surface for the fabric.

9. In a splitting and cutting machine for embroidered fabrics, a rotatable cutting element provided with a contact surface for the embroidered fabric and having a series of depressed grooves extending transversely of the path of rotation and in staggered relationship to each other and also having another series of circumferential grooves communicating with the said transverse gooves, and means in said circumferential grooves cooperating with the walls of the tranverse grooves to cut threads on the contacting face of said fabric.

10. In a thread-splitting and cutting machine for embroidered fabrics, a rotatable cutting element embodying a shaft, a series of abutting cutting rings mounted on said shaft, each provided with a contact surface for the embroidered fabric and having a plurality of depressed groove portions intersecting said contact surface transversely of the path of movement thereof and also having a depressed circumferential groove portion communicating with the transverse groove, and a stationary cutter blade having a portion disposed in contact with each circumferential groove portion and cooperating with the side walls of the transverse cutting-grooves to cut the threads from the contacting face of the embroidered fabric.

11. In a thread-splitting and cutting machine for embroidered fabrics, a rotatable cutting element embodying a shaft, a series of abutting cutting-rings mounted on said shaft, each provided with a contact surface for the embroidered fabric and having a plurality of depressed groove portions intersecting said contact surface transversely of the path of movement thereof and also having a depressed circumferential groove portion communicating with the transverse groove, the said series of cutting rings being arranged on said shaft in such relationship that the transverse grooves will be positioned in staggered relationship to each other, and a stationary cutter blade disposed in contact with each circumferential groove portion and cooperating with the side walls of the transverse cutting grooves to cut the threads from the contacting face of the embroidered fabric.

12. In a thread-splitting and cutting machine for embroidered fabrics, embodying a suitable frame, a plurality of shafts suitably mounted in said frame; cutting elements mounted on each of said shafts having a series of depressed grooves extending transversely of the path of rotation of said cutting element, another series of circumferential grooves intersecting the said transverse grooves and means cooperating with the walls of the transverse grooves to cut threads on the contacting face of said fabric.

13. In a splitting and cutting machine for embroidered fabrics, embodying a suitable frame, a plurality of shafts suitably mounted in said frame; cutting elements mounted on each of said shafts having a series of depressed grooves intersecting said contact surface transversely of the path of movement thereof and also having depressed circumferential grooves communicating with the transverse grooves, and a stationary cutter blade disposed in contact with each circumferential groove portion to cooperate with the side walls of the transverse cutting grooves to cut the threads from the contacting face of the embroidered fabric, the said stationary blades being mounted at one side of one of said cutting elements to sever threads on one face of the embroidered fabric and on the opposite side of another of said cutting elements to sever threads on the opposite face of said embroidered fabric, and means arranged to guide one face of said embroidered fabric into contact with a cutting element and then the opposite face.

14. In a thread-splitting and cutting machine for embroidered fabrics, embodying a suitable frame, a plurality of shafts mounted in pairs in said frame; cutting devices mounted on said shafts, each having a series of depressed grooves intersecting said contact surface transversely of the path of movement thereof and also having depressed circumferential grooves communicating with the transverse grooves, a stationary cutter blade having a portion disposed in each circumferential groove and cooperating with the side walls of the transverse cutting grooves to cut the threads from the contacting face of the embroidered fabric, the said stationary blades being mounted at one side of one pair of said cutting elements to sever threads on one face of the embroidered fabric and on the opposite side of another of said cutting elements to sever threads on the opposite face of said embroidered fabric, and means for guiding the fabric into contact with the opposite sides of the pairs of said cutting elements.

15. In a thread-splitting and cutting machine for embroidered fabrics, embodying a suitable frame, a plurality of shafts suitably mounted in said frame; cutting elements mounted on each of said shafts having a series of depressed grooves intersecting said contact surface transversely of the path of movement thereof and also having depressed circumferential grooves communicating with the transverse grooves, a stationary cutter blade having a portion disposed in each circumferential groove and cooperating with the side walls of the transverse cutting grooves to cut the threads from the contacting face of the embroidered fabric, the said stationary blades being mounted at one side of one of said cutting elements to sever threads on one face of the embroidered fabric and on the opposite side of another of said cutting elements to sever threads on the opposite face of said embroidered fabric, means for stretching the embroidered fabric, means for guiding the same into contact with said cutting elements and a feed rack on which said embroidered fabric is initially mounted.

16. In a thread-splitting and cutting machine for embroidered fabrics, embodying a suitable frame; a plurality of shafts suitably mounted in said frame; cutting elements mounted on each of said shafts having a series of depressed grooves intersecting said contact surface transversely of the path of movement thereof and also having depressed circumferential grooves communicating with the transverse grooves; a stationary cutter blade having a portion disposed in contact with each circumferential groove and cooperating with the side walls of the transverse cutting-grooves to cut the threads from the contacting face of the embroidered fabric, the said stationary blades being mounted at one side of one of said cutting elements to sever threads on one face of the embroidered fabric and on the opposite side of another of said cutting elements to sever threads on the opposite face of said embroidered fabric; means for stretching the embroidered fabric; means for guiding the same into contact with said cutting elements, a feed rack on which said embroidered fabric is initially mounted and a fabric folding device at the opposite end of said machine.

In witness whereof, I have signed my name to the foregoing specification in the presence of the subscribing witness.

JOHN BLUM.

Witness:
EDWARD HOLLANDER.